(12) United States Patent
Yang (10) Patent No.: US 11,160,127 B2
(45) Date of Patent: Oct. 26, 2021

(54) LOCATING METHOD IN MULTI-CONNECTIVITY NETWORK, TERMINAL DEVICE AND LOCATION MANAGEMENT FUNCTION ENTITY

(71) Applicant: GUANGDONG OPPO MOBILE TELECOMMUNICATIONS CORP., LTD., Dongguan (CN)

(72) Inventor: Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/882,643

(22) Filed: May 25, 2020

(65) Prior Publication Data

US 2020/0288524 A1    Sep. 10, 2020

Related U.S. Application Data

(63) Continuation of application No. PCT/CN2018/072234, filed on Jan. 11, 2018.

(51) Int. Cl.
*H04W 76/15* (2018.01)
*H04W 76/11* (2018.01)
(Continued)

(52) U.S. Cl.
CPC .......... *H04W 76/15* (2018.02); *H04W 4/025* (2013.01); *H04W 48/20* (2013.01);
(Continued)

(58) Field of Classification Search
CPC ..... H04W 76/15; H04W 76/11; H04W 76/27; H04W 4/025; H04W 48/20; H04W 56/005; H04W 4/02; H04W 56/00
See application file for complete search history.

(56) References Cited

U.S. PATENT DOCUMENTS

2005/0272440 A1   12/2005   Li
2012/0088518 A1   4/2012    Edge
(Continued)

FOREIGN PATENT DOCUMENTS

CN   101959301 A   1/2011
CN   105744618 A   7/2016
(Continued)

OTHER PUBLICATIONS

International Application No. PCT/CN2018/072234, International search report, dated Jun. 22, 2018, 2 pages.
(Continued)

*Primary Examiner* — Anez C Ebrahim
(74) *Attorney, Agent, or Firm* — Bayes PLLC (57) ABSTRACT

A locating method in a multi-connectivity network, a terminal device, and a location management function entity are provided. The locating method may include determining, by the terminal device, the position of the terminal device using a first radio access technology (RAT). The locating method may also include sending, by the terminal device, a locating message of the terminal device to a location management function entity through signaling over an air interface using a second RAT. The locating message of the terminal device may include a first locating parameter of a cell of a first node corresponding to the first RAT and a second locating parameter of a cell of a second node corresponding to the second RAT.

20 Claims, 5 Drawing Sheets

(51) Int. Cl.
*H04W 76/27* (2018.01)
*H04W 4/02* (2018.01)
*H04W 48/20* (2009.01)
*H04W 56/00* (2009.01)
*H04W 92/10* (2009.01)

(52) U.S. Cl.
CPC .......... *H04W 56/005* (2013.01); *H04W 76/11* (2018.02); *H04W 76/27* (2018.02); *H04W 92/10* (2013.01)

(56) References Cited

U.S. PATENT DOCUMENTS

| | | | |
|---|---|---|---|
| 2012/0295623 | A1 | 11/2012 | Siomina et al. |
| 2015/0105077 | A1* | 4/2015 | Yao .................. H04W 36/0061 455/436 |
| 2015/0319132 | A1* | 11/2015 | Moon .................. H04L 61/106 709/245 |
| 2017/0078937 | A1 | 3/2017 | El-Najjar et al. |
| 2018/0279169 | A1* | 9/2018 | Wang ........................ H04L 1/08 |

FOREIGN PATENT DOCUMENTS

| | | |
|---|---|---|
| CN | 105812109 A | 7/2016 |
| EP | 1 077 420 A2 | 2/2001 |
| EP | 1077420 A2 | 2/2001 |
| EP | 2 728 763 A1 | 5/2014 |
| EP | 2728763 A1 | 5/2014 |
| JP | 2013520072 A | 5/2013 |
| JP | 2013534076 A | 8/2013 |
| JP | 2015531206 A | 10/2015 |
| RU | 2564118 C2 | 9/2015 |
| WO | 2011099909 A1 | 8/2011 |
| WO | 2011150259 A1 | 12/2011 |
| WO | 2014025302 A1 | 2/2014 |
| WO | 2016173494 A1 | 11/2016 |

OTHER PUBLICATIONS

"Support of measurement gaps for location related inter-RAT measurements", R2-1712382, GPP TSG-RAN WG2 #100, Agenda Item: 10.2.18, Source: Ericsson, Reno, Nevada, USA, Nov. 27-Dec. 1, 2017, 2 pages.
"Protocol impacts of positioning in NR", R2-1712540, 3GPP TSG-RAN WG2 #100, Agenda Item: 10.2.18, Source: Huawei, HiSilicon, Reno, Nevada, USA, Nov. 27-Dec. 1, 2017, 4 pages.
"Support NR positioning under dual connectivity", R2-1713253, 3GPP TSG-RAN WG2 Meeting #100, Agenda Item: 10.2.18, Source: LG Electronics Inc., Reno, USA, Nov. 27-Dec. 1, 2017, 2 pages.
Written Opinion of the International Searching Authority, issued in corresponding International Application No. PCT/CN2018/072234, dated Jun. 22, 2018, 8 pages.
The extended European search report for European application 18900419.5 dated Oct. 7, 2020.
The Examination report No. 1 for Australian standard patent application 2018401423 dated Nov. 30, 2020.
Examination report No. 2 for standard patent application, issued in corresponding Australian Application No. 2018401423, dated Mar. 30, 2021, 5 pages.
Rugeland, Patrik et al., "Architectural enablers and concepts for mm-wave RAN integration", 5G PPP mmMAGIC, Mar. 29, 2017, Version: 1.0, 26 pages.
The First Office Action for Russian patent application 2020122153 dated Jan. 26, 2021, 12 pages.
First Examination Report issued in corresponding Chinese Application No. 202010390699.2, dated May 19, 2021, 11 pages.
Communication pursuant to Article 94(3) EPC issued in corresponding European Application No. 18 900 419.5, dated Apr. 26, 2021, 8 pages.
First Examination Report issued in corresponding Canadian Application No. 3,086,702, dated Jul. 9, 2021, 6 pages.
Notice of Preliminary Rejection issued in corresponding Korean Application No. 10-2020-7018877, dated Jul. 24, 2021, 11 pages.
Second Office action issued in corresponding Chinese Application No. 202010390699.2, dated Jul. 30, 2021, 13 pages.
Office action issued in corresponding Japanese Application No. 2020-537660, dated Aug. 20, 2021, 8 pages.
Second Office action issued in corresponding Chinese Application No. 202010390699.2, dated Jul. 30, 2021, 7 pages.
Office action issued in corresponding Japanese Application No. 2020-537660, dated Aug. 20, 2021, 4 pages.
First Examination Report issued in corresponding India Application No. 202027030627, dated Aug. 25, 2021, 7 pages.

\* cited by examiner

LOCATING METHOD IN MULTI-CONNECTIVITY NETWORK, TERMINAL DEVICE AND LOCATION MANAGEMENT FUNCTION ENTITY

CROSS-REFERENCE TO RELATED APPLICATION

This application is continuation of International Application No. PCT/CN2018/072234, filed on Jan. 11, 2018, which is hereby incorporated by reference in its entirety.

BACKGROUND

Implementations of this application relate to the communications field, and more specifically, to a locating method in a multi-connectivity network, a terminal device, and a location management function entity.

Locating is a basic requirement of a communications system. In a 5G architecture, a new location management function (LMF) entity is introduced, and a locating message of a terminal is transmitted as a non-access stratum (NAS) payload message included in a radio resource control (RRC) message. For a multi-connectivity network, an RRC connection exists on a node but does not necessarily exist on another node. In the related art, the terminal usually uses a radio access technology (RAT) used by the node with the RRC connection to locate the terminal and performs transmission and interaction of the locating message with the LMF entity. Consequently, a locating operation is inflexible.

SUMMARY

In view of this, implementations of this application provide a locating method in a multi-connectivity network, a terminal device, and a location management function entity.

According to a first aspect, a locating method in a multi-connectivity network is provided including determining the position of a terminal device using a first radio access technology RAT, and sending, by the terminal device, a locating message of the terminal device to a location management function entity through signaling over an air interface using a second RAT.

According to a second aspect, a locating method in a multi-connectivity network is provided including receiving, by a location management function entity, a locating message of a terminal device sent by the terminal device through signaling over an air interface using a second radio access technology RAT, and locating, by the location management function entity, the terminal device according to the locating message of the terminal device.

According to a third aspect, a terminal device is provided, configured to perform the method according to the first aspect or any suitable implementation of the first aspect. Specifically, the terminal device includes units configured to perform the method according to the first aspect or any suitable implementation of the first aspect.

According to a fourth aspect, a location management function entity is provided, configured to perform the method according to the second aspect or any suitable implementation of the second aspect. Specifically, the location management function entity includes units configured to perform the method according to the second aspect or any suitable implementation of the second aspect.

According to a fifth aspect, a terminal device is provided including a memory, a processor, an input interface, and an output interface. The memory, the processor, the input interface, and the output interface are connected through a bus system. The memory is configured to store computer-readable instructions, and the processor is configured to execute the instructions stored in the memory, to perform the method according to the first aspect or any suitable implementation of the first aspect.

According to a sixth aspect, a location management function entity is provided including a memory, a processor, an input interface, and an output interface. The memory, the processor, the input interface, and the output interface are connected through a bus system. The memory is configured to store computer-readable instructions, and the processor is configured to execute the instructions stored in the memory, to perform the method according to the second aspect or any suitable implementation of the second aspect.

According to a seventh aspect, a computer storage medium is provided, configured to store a computer software program including computer-readable instructions, when executed by a processor, perform the method in the foregoing first aspect or any suitable implementation of the first aspect, or the method in the foregoing second aspect or any suitable implementation of the second aspect, and the computer storage medium includes a designed program used to perform the foregoing aspects.

According to an eighth aspect, a computer program product including computer-readable instructions is provided, and when the computer program product is run on a computer, the computer is enabled to perform the method in the foregoing first aspect, any suitable implementation of the first aspect, the method in the foregoing second aspect, or any suitable implementation of the second aspect.

DETAILED DESCRIPTION

The technical solutions in the implementations of this application are described clearly with reference to the accompanying drawings in the implementations of this application below.

It is understood that the technical solutions of the implementations of this application may be applied to various communications systems, such as a Global System for Mobile Communications (GSM), a Code Division Multiple Access (CDMA) system, a Wideband Code Division Multiple Access (WCDMA), a General Packet Radio Service (GPRS), a Long-Term Evolution (LTE) system, an LTE Frequency Division Duplex (FDD) system, an LTE Time Division Duplex (TDD) system, a Universal Mobile Telecommunications System (UMTS) system, a Worldwide Interoperability for Microwave Access (WiMAX) communications system, a New Radio (NR) system, and a future 5G communications system.

The technical solutions of the implementations of this application may be applied to various communications systems based on a Non-Orthogonal Multiple Access technology, for example, a Sparse Code Multiple Access (SCMA) system and a Low Density Signature (LDS) system. The SCMA system and the LDS system may also be referred to as other names in the communications field. Further, the technical solutions of the implementations of this application may be applied to multi-carrier transmission systems in which the Non-Orthogonal Multiple Access technology is used, for example, an Orthogonal Frequency Division Multiplexing (OFDM) system, a Filter Bank Multi-Carrier (FBMC) system, a Generalized Frequency Division Multiplexing (GFDM) system, and a filtered-Orthogonal Frequency Division Multiplexing (F-OFDM) system in which the Non-Orthogonal Multiple Access technology is used.

A terminal device in the implementations of this application may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN) or the like. This does not limit the implementations of this application.

A network device in the implementations of this application may be a device configured to communicate with the terminal device. The network device may be a base transceiver station (BTS) in GSM or CDMA, a NodeB (NB) in a WCDMA system, an evolved NodeB (eNB or eNodeB) in an LTE system, or a wireless controller in a cloud radio access network (CRAN) scenario. The network device may also be a relay station, an access point, an in-vehicle device, a wearable device, a network device in a future 5G network, a network device in a future evolved PLMN network, or the like. This does not limit the implementations of this application.

Figure 1:
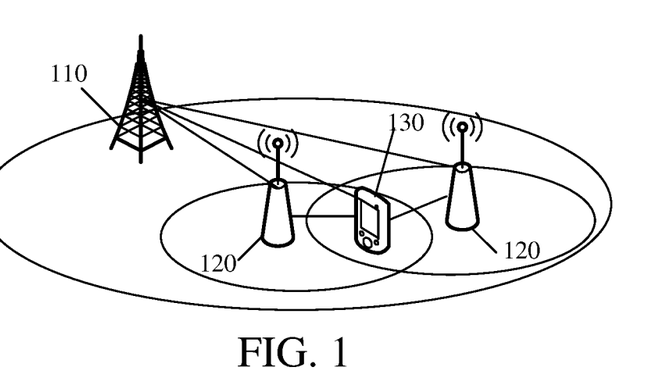
FIG. 1 is a schematic diagram of an application scenario according to an implementation of this application.

FIG. 1 is a schematic diagram of an application scenario according to this application, and a primary node 110 and at least one secondary node 120 are included in surrounding nodes of a terminal device 130. The at least one secondary node 120 is separately connected to the primary node 110, to form a multi-connectivity, and the primary node 110 is separately connected to the terminal device 130 to provide services for the terminal device 130. The primary node 110 may be an LTE network, and the secondary node 120 may be an NR network. Alternatively, the primary node 110 may be an NR network, and the secondary node 120 may be an LTE network. Alternatively, both the primary node 110 and the secondary node 120 are NR networks. Application scenarios of the technical solutions are not limited in this application. The terminal device 130 may establish a connection with the secondary node 120 at the same time through the primary node 110. A connection established by the terminal device 130 with the primary node 110 is a primary connection, and a connection established by the terminal device 130 with the secondary node 120 is a secondary connection. Control signaling of the terminal device 130 may be transmitted through the primary connection, and data of the terminal device may be transmitted through the primary connection and the secondary connection at the same time or may be transmitted merely through the secondary connection. The primary node 110 of this implementation of this application may select a secondary node 120 meeting a preset condition to transmit the data of the terminal device 130, so as to further reduce a load of the primary node 110. For example, the preset condition may be that the quality of a link between the secondary node 120 and the terminal device 130 meets a data transmission condition.

In the implementations of this application, the secondary node 120 may be flexibly deployed according to a service requirement and a user density. A function of the secondary node 120 is to assist the primary node 110 in sharing data. Deployment of the secondary node 120 may be discontinuous, and there may be a large overlapping area between neighboring secondary cells. This does not limit the implementations of this application.

In the implementations of this application, the primary node may be, for example, a macrocell, and the secondary node may be, for example, a microcell, a picocell or a femtocell. However, the implementations of this application are not limited by these examples.

More specifically, the primary node may be an LTE node, and the secondary node is an NR node; or the primary node and the secondary node may both be NR nodes. It is understood that the implementations of this application are not limited thereto, the primary node may be further a GSM network device, a CDMA network device, or the like, and the secondary node may also be a GSM network device, a CDMA network device, or the like. This does not limit the implementations of this application.

In a communications system, a core network node may be further included. The core network node may be a 5G core network node, for example, an access and mobility management function (AMF), and for another example, a session management function (SMF). The core network node may be an evolved packet core (EPC) of an LTE network, for example, a session management function+core packet gateway (SMF+PGW–C).

An LTE system supports different locating mechanisms, including a RAT related locating mechanism and a RAT unrelated locating mechanism. The RAT related locating mechanism includes a triangulation mechanism such as uplink time difference of arrival (TDoA) locating, downlink TDoA locating, and relatively simple cell identifier (ID) locating. The RAT unrelated locating mechanism includes a global navigation satellite system (GNSS). A lightweight presentation protocol (LPP) or an LPPa protocol is the main protocol configured to support the locating mechanisms. An LPP/LPPa message is transmitted from a terminal to a network side in a NAS manner, and the network side may be, for example, a gateway mobile location center (GMLC). The LPP/LPPa message is usually a locating message of the terminal device.

In a 5G system, an LMF entity is introduced, and the LMF is configured to implement a locating operation on the terminal device.

Figure 2:
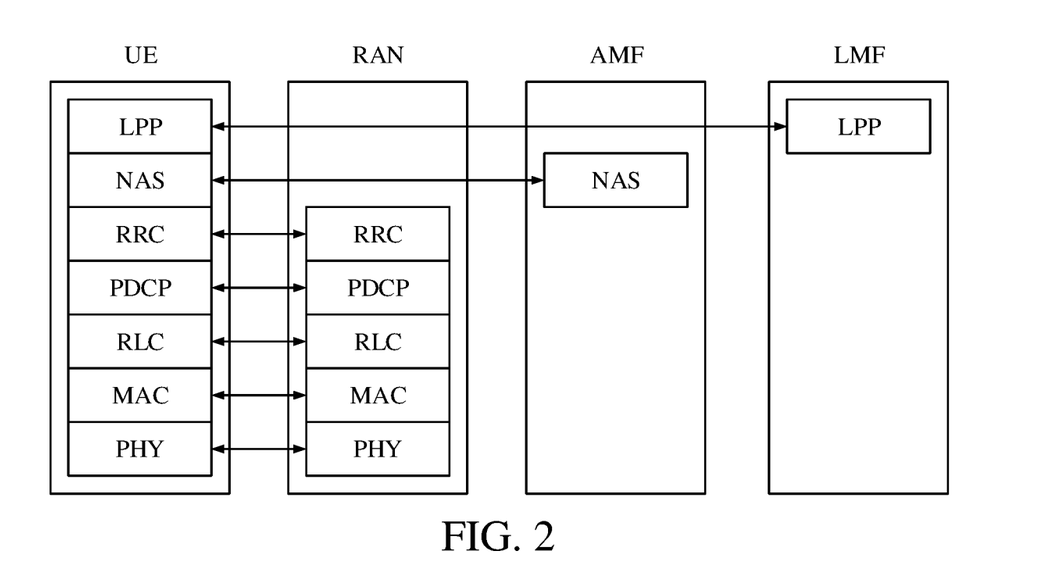
FIG. 2 is a schematic block diagram of a protocol stack in a 5G architecture according to an implementation of this application.

For ease of understanding, a protocol stack in a 5G architecture is simply described first with reference to FIG. 2. A protocol layer between UE and a radio access network (RAN) includes a physical (PHY) layer, a media access control (MAC) layer, a radio link control (RLC) layer, a packet data convergence protocol (PDCP) layer and an RRC layer. A protocol layer between the UE and an AMF includes a NAS layer, and a protocol layer between the UE and an LMF includes an LPP layer. An LPP message may be transmitted as a NAS payload message included in an RRC message over an air interface.

Because in a dual-connectivity network, an RRC connection exists on a node but does not necessarily exist on another node. The terminal usually uses a RAT used by the node with the RRC connection to locate the terminal and performs transmission and interaction of the locating message with the LMF entity. Consequently, a locating operation is inflexible. That is, a RAT for locating is bundled together with a RAT for transmitting a locating message, while solutions of the implementations of this application may decouple the RAT for locating from the RAT for transmitting the locating message, to implement a flexible locating operation.

Figure 3:
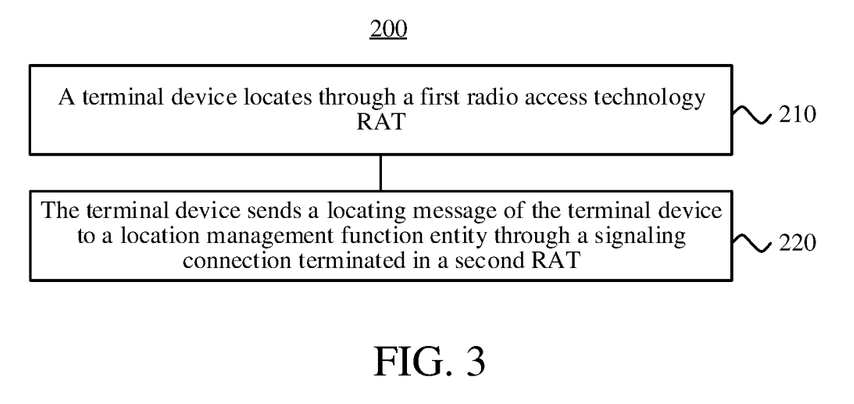
FIG. 3 is a schematic block diagram of a locating method in a multi-connectivity network according to an implementation of this application.

FIG. 3 is a schematic block diagram of a locating method 200 in a multi-connectivity network according to an implementation of this application. As shown in FIG. 3, the locating method 200 includes the following steps:

S210: A terminal device locates through a first radio access technology RAT.

S220: The terminal device sends a locating message of the terminal device to a location management function entity through a signaling connection terminated in a second RAT.

Specifically, the terminal device may separately interact with a node using the first RAT and a node using the second RAT. It may be considered that locating parameters of cells used by the terminal device are locating parameters of some cells served by the node using the first RAT. The terminal device may send the locating message of the terminal device to the location management function entity over an air interface through the signaling of the second RAT. For example, in a dual-connectivity scenario, the terminal device is separately connected to a primary node and a secondary node, where the primary node and the secondary node separately use different RATs, and the terminal device may locate through the secondary node, and send the locating message of the terminal device to the location management function entity through a signaling connection with the primary node.

Therefore, the locating method in the multi-connectivity network of this implementation of this application is more conducive to improvement in flexibility of a locating operation by decoupling a RAT for locating from a RAT for sending a locating message.

The locating message of the terminal device includes a locating parameter of a cell of a node corresponding to the first RAT.

Specifically, if the locating message of the terminal device is related to a RAT, the terminal device may send a locating parameter of a cell corresponding to the RAT for locating to the location management function entity, so that the location management function entity locates the terminal device through the locating parameter of the cell. For example, in the dual-connectivity scenario, the terminal device is separately connected to a primary node and a secondary node, where the primary node and the secondary node separately use different RATs, the primary node includes a cell, that is, a primary cell, and the secondary node also includes a cell, that is, a secondary cell. If the terminal device locates through a locating parameter of the secondary cell, the terminal device may send the locating parameter of the secondary cell to the location management function entity through signaling of the primary node.

In an implementation of this application, the node corresponding to the first RAT is a secondary node providing a service for the terminal device in the multi-connectivity network.

The multi-connectivity architecture currently discussed mainly includes LTE+NR dual connectivity (EN-DC) and NR+LTE dual connectivity (NE-DC). In the EN-DC, the primary node uses LTE, and the secondary node uses NR. Because an LTE cell is a primary cell with a relatively large coverage area, and an NR cell is a secondary cell with a relatively small coverage area, higher accuracy may be achieved if locating is performed through a cell ID of the secondary cell. In the NE-DC, the primary node uses NR, and the secondary node uses LTE. Because an NR cell is a primary cell, and there is a possibility that some terminal devices do not support a locating mechanism in the NR primary cell, locating may be completed only by using an LTE secondary cell to locate.

In an implementation of this application, the locating message of the terminal device further includes a locating parameter of a cell of a node corresponding to the second RAT.

That is, the terminal device may simultaneously report locating parameters of cells of a plurality of nodes using different RATs and connected to the terminal device. For example, the terminal device may simultaneously send a locating parameter of an NR cell and a locating parameter of an LTE cell to the location management function entity. It is understood that each node may serve a plurality of cells, that is, the terminal device may simultaneously send locating parameters of a plurality of cells to the location management function entity, and a network device may select a locating parameter of a cell from the locating parameters, to locate the terminal device. The location management function entity may perform selection according to a cell ID of each cell, and may also separately carry an identifier of each cell in the locating message of the terminal device, or may mark the primary cell and the secondary cell merely in the locating message, but does not specifically distinguish a secondary cell from another secondary cell.

In an implementation of this application, the node corresponding to the second RAT is a primary node providing a service for the terminal device in the multi-connectivity network.

In an implementation of this application, the sending, by the terminal device, a locating message of the terminal device to a location management function entity through a signaling connection terminated in a second RAT includes: sending, by the terminal device, the locating message of the terminal device to the location management function entity through a radio resource control RRC layer of the primary node.

In a dual-connectivity network, an RRC connection configured to transmit the locating message always exists on the primary node, and therefore the terminal device may send a locating parameter of a cell served by the secondary node to the location management function entity directly through signaling of the primary node. For example, the terminal device may send the locating parameter of the secondary cell of the secondary node to the location management function entity through an RRC layer of the primary cell of the primary node.

The locating message is transmitted through the primary node, which enables the terminal to perform a locating operation through a RAT of the secondary node even if there is not an RRC connection with the secondary node.

In an implementation of this application, the locating message of the terminal device includes at least one of the following parameters: uplink and downlink time differences of arrival TDoA, a global navigation satellite system GNSS, and a cell identifier ID.

It is understood that the locating message of the terminal device may further include parameters in other locating mechanisms. The implementations of this application are not limited thereto.

It is further understood that this specification mostly makes description by taking an example in which dual-connectivity is used, and there is merely one cell in each connection, but the implementations of this application are not limited thereto. For example, there is a plurality of cells in each connection, where a primary cell may merely belong to a primary connection, and a secondary connection may merely include a secondary cell.

Figure 4:
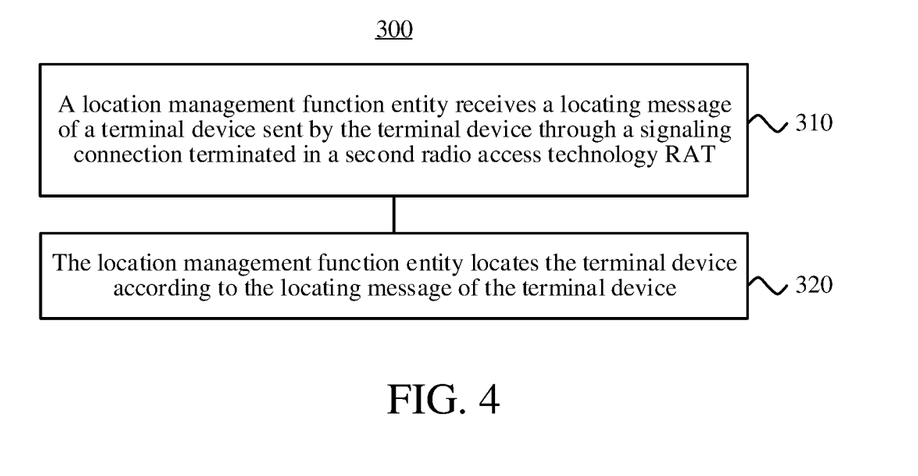
FIG. 4 is another schematic block diagram of a locating method in a multi-connectivity network according to an implementation of this application.

FIG. 4 is a schematic block diagram of a locating method 300 in a multi-connectivity network according to an implementation of this application. As shown in FIG. 4, the locating method 300 includes some or all of the following content:

S310: A location management function entity receives a locating message of a terminal device sent by the terminal device through a signaling connection terminated in a second radio access technology RAT.

S320: The location management function entity locates the terminal device according to the locating message of the terminal device.

Therefore, the locating method in the multi-connectivity network of this implementation of this application is more conducive to improvement in flexibility of a locating operation by decoupling a RAT for locating from a RAT for sending a locating message.

In an implementation of this application, the locating message of the terminal device includes a locating parameter of a cell of a node corresponding to the first RAT, and the terminal device is located through the first RAT.

In an implementation of this application, the node corresponding to the first RAT is a secondary node providing a service for the terminal device in the multi-connectivity network.

In an implementation of this application, the locating message of the terminal device further includes a locating parameter of a cell of a node corresponding to the second RAT.

In an implementation of this application, the node corresponding to the second RAT is a primary node providing a service for the terminal device in the multi-connectivity network.

In an implementation of this application, the locating message of the terminal device includes a locating parameter of each cell in a plurality of cells, and the method further includes: selecting, by the location management function entity, a target cell from the plurality of cells; and the locating, by the location management function entity, the terminal device according to the locating message of the terminal device includes: locating, by the location management function entity, the terminal device according to a locating parameter of the target cell.

In an implementation of this application, the locating message of the terminal device includes at least one of the following parameters: uplink and downlink time differences of arrival TDoA, a global navigation satellite system GNSS, and a cell identifier ID.

In an implementation of this application, the first RAT is Long-Term Evolution (LTE), and the second RAT is New Radio NR; or the first RAT is New Radio NR, and the second RAT is Long-Term Evolution (LTE).

It is understood that the term "and/or" in this specification is only an association relationship for describing the associated objects and represents that three relationships may exist, for example, A and/or B may represent the following three cases: A exists separately, both A and B exist, and B exists separately. In addition, the character "/" in this specification generally indicates an "or" relationship between the associated objects.

It is understood that the interaction between the location management function entity and the terminal device, related features, functions, and the like that are described for the location management function entity correspond to related features and functions of the terminal device. Moreover, related content has been described in detail in the foregoing method 200. For brevity, details are not described herein again.

It is understood that sequence numbers of the foregoing processes do not mean execution sequences in various implementations of this application. The execution sequences of the processes should be determined according to functions and internal logic of the processes, and should not be construed as any limitation on the implementation processes of the implementations of this application.

The locating method in the multi-connectivity network, according to the implementations of this application, is described above in detail. A locating apparatus in a multi-connectivity network according to the implementations of this application is described below with reference to FIG. 5 to FIG. 8. Technical features described in the method implementations are applicable to the following apparatus implementations.

Figure 5:
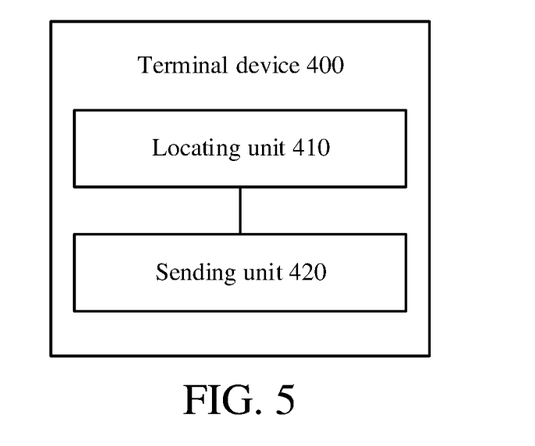
FIG. 5 is a schematic block diagram of a terminal device according to an implementation of this application.

FIG. 5 is a schematic block diagram of a terminal device 400 according to an implementation of this application. As shown in FIG. 5, the terminal device 400 includes a locating unit 410, configured to locate through a first radio access technology RAT and a sending unit 420, configured to send a locating message of the terminal device to a location management function entity through a signaling connection terminated in a second RAT.

Therefore, the terminal device of this implementation of this application is more conducive to improvement in the flexibility of a locating operation by decoupling a RAT for locating from a RAT for sending a locating message.

It is understood that the terminal device 400 according to this implementation of this application may correspond to the terminal device in the method implementation of this application, and the foregoing and other operations and/or functions of units in the terminal device 400 are respectively used to implement corresponding procedures of the terminal device in the method in FIG. 3. For brevity, details are not described herein again.

Figure 6:
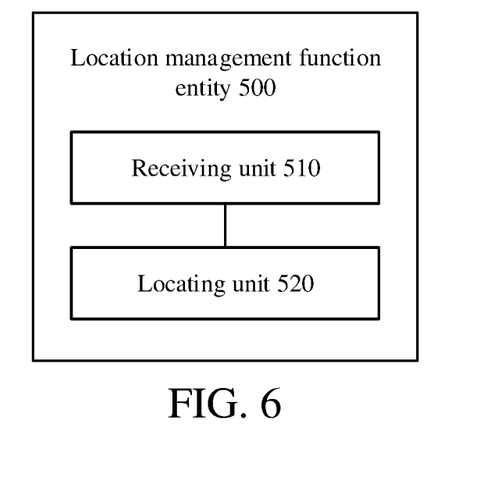
FIG. 6 is a schematic block diagram of a location management function entity according to an implementation of this application.

FIG. 6 is a schematic block diagram of a location management function entity 500, according to an implementation of this application. As shown in FIG. 6, the location management function entity 500 includes a receiving unit 510, configured to receive a locating message of a terminal device sent by the terminal device through a signaling connection terminated in a second radio access technology RAT; and a locating unit 520, configured to locate the terminal device according to the locating message of the terminal device.

Therefore, the location management function entity of this implementation of this application is more conducive to improvement in the flexibility of a locating operation by decoupling a RAT for locating from a RAT for sending a locating message.

It is understood that the location management function entity 500 according to this implementation of this application may correspond to the location management function entity in the method implementation of this application, and the foregoing and other operations and/or functions of units in the location management function entity 500 are respectively used to implement corresponding procedures of the location management function entity in the method in FIG. 4. For brevity, details are not described herein again.

Figure 7:
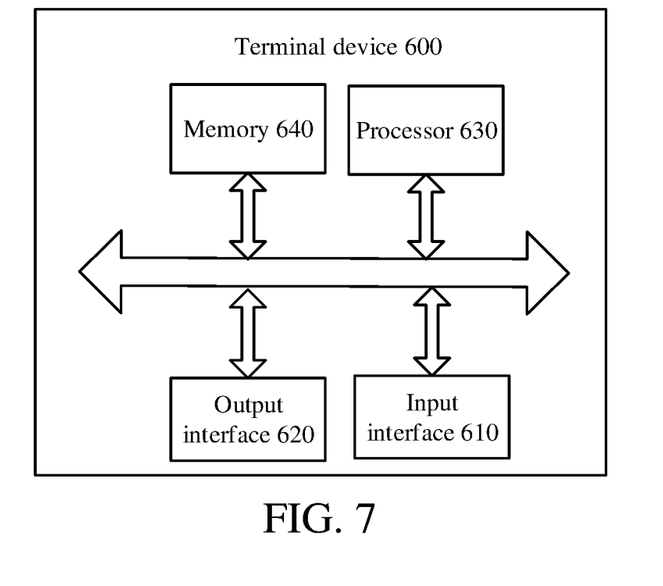
FIG. 7 is another schematic block diagram of a terminal device according to an implementation of this application.

As shown in FIG. 7, an implementation of this application further provides a terminal device 600. The terminal device 600 may be the terminal device 400 in FIG. 5 and can be configured to perform the functions of the terminal device corresponding to the method 200 in FIG. 3. The terminal device 600 includes an input interface 610, an output interface 620, a processor 630, and a memory 640, and the input interface 610, the output interface 620, the processor 630, and the memory 640 may be connected through a bus system. The memory 640 is configured to store a program, an instruction, or a code. The processor 630 is configured to execute the program, the instruction, or the code in the memory 640, so as to control the input interface 610 to receive a signal, control the output interface 620 to send a signal, and complete operations in the foregoing method implementation.

Therefore, the terminal device of this implementation of this application is more conducive to improvement in the flexibility of a locating operation by decoupling a RAT for locating from a RAT for sending a locating message.

It is understood that, in this implementation of this application, the processor 630 may be a central processing unit (CPU), or the processor 630 may be another general-purpose processor, a digital signal processor (DSP), an application-specific integrated circuit (ASIC), a field-programmable gate array (FPGA), or another programmable logic device, discrete gate or transistor logical device, or discrete hardware component, or the like. The general-purpose processor may be a microprocessor, or the processor may be any conventional processor or the like.

The memory 640 may include a read-only memory and a random access memory, and provide an instruction and data to the processor 630. A part of the memory 640 may further include a non-volatile random-access memory. For example, the memory 640 may further store information about a device type.

In an implementation process, each piece of content of the foregoing methods may be implemented by a hardware-integrated logic circuit in the processor 630 or by an instruction in a software form. The content of the method disclosed with reference to the implementations of this application may be directly performed by a hardware processor or may be performed by using a combination of hardware in the processor and a software module. The software module may be located in a mature storage medium in the field, such as a random-access memory, a flash memory, a read-only memory, a programmable read-only memory, an electrically-erasable programmable memory, or a register. The storage medium is located in the memory 640, and the processor 630 reads the information in the memory 640 and completes the content in the foregoing methods in combination with hardware of the processor. To avoid repetition, details are not described herein again.

In a specific implementation, the locating unit in the terminal device 400 may be implemented by the processor 630 in FIG. 7, and the sending unit of the terminal device 400 may be implemented by the output interface 620 in FIG. 7.

Figure 8:
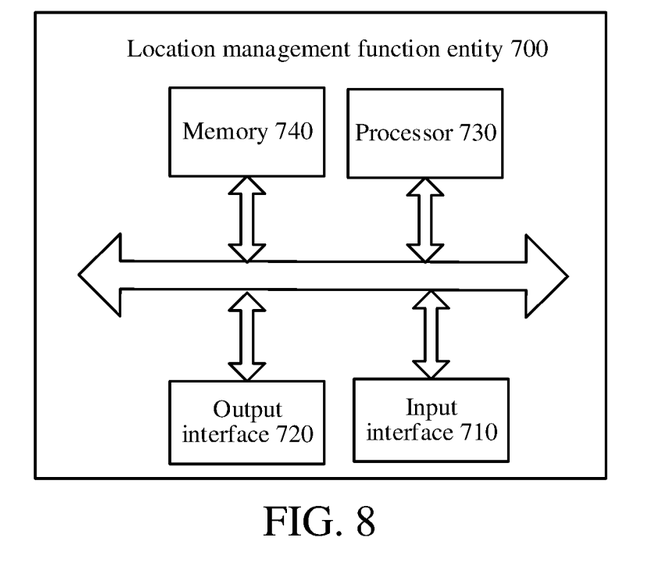
FIG. 8 is another schematic block diagram of a location management function entity according to an implementation of this application.

As shown in FIG. 8, an implementation of this application further provides a location management function entity 700. The location management function entity 700 may be the location management function entity 500 in FIG. 6 and can be configured to perform the functions of the location management function entity corresponding to the method 300 in FIG. 4. The location management function entity 700 includes an input interface 710, an output interface 720, a processor 730, and a memory 740. The input interface 710, the output interface 720, the processor 730, and the memory 740 may be connected through a bus system. The memory 740 is configured to store a program, an instruction, or a code. The processor 730 is configured to execute the program, the instruction, or the code in the memory 740, so as to control the input interface 710 to receive a signal, control the output interface 720 to send a signal, and complete operations in the foregoing method implementation.

Therefore, the location management function entity of this implementation of this application is more conducive to improvement in the flexibility of a locating operation by decoupling a RAT for locating from a RAT for sending a locating message.

It is understood that, in this implementation of this application, the processor 730 may be a CPU, or the processor 730 may be another general-purpose processor, a DSP, an ASIC, an FPGA, or another programmable logic device, discrete gate or transistor logical device, or discrete hardware component, or the like. The general-purpose processor may be a microprocessor, or the processor may be any conventional processor or the like.

The memory 740 may include a read-only memory and a random access memory, and provide an instruction and data to the processor 730. A part of the memory 740 may further include a non-volatile random-access memory. For example, the memory 740 may further store information about a device type.

In an implementation process, each piece of content of the foregoing methods may be implemented by a hardware-integrated logic circuit in the processor 730 or by an instruction in a software form. The content of the method disclosed with reference to the implementations of this application may be directly performed by a hardware processor or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 740, and the processor 730 reads the information in the memory 740 and completes the content in the foregoing methods in combination with hardware of the processor. To avoid repetition, details are not described herein again.

In a specific implementation, the locating unit and the selecting unit in the location management function entity 700 may be implemented by the output interface 720 in FIG. 8, and the receiving unit in the location management function entity 700 may be implemented by the input interface 710 in FIG. 8.

It is understood that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood that for the purpose of convenience and simplicity, for a detailed working process of the foregoing system, apparatus, and unit, reference may be made to a corresponding process in the foregoing method implementations, and details are not described herein again.

In the several implementations provided in this application, it is understood that the disclosed system, apparatus, and method may be implemented in other manners. For example, the described apparatus implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementations.

In addition, functional units in the implementations of this application may be integrated into one processing unit, or each of the units may exist alone physically, or two or more units are integrated into one unit.

When the functions are implemented in the form of a software functional module and sold or used as an independent product, the functions may be stored in a computer-readable storage medium. Based on such an understanding, the technical solutions of this application, or part of the technical solutions, may be implemented in the form of a software product. The computer software product is stored in a storage medium and includes several instructions for instructing a computer device (which may be a personal computer, a server, a network device, or the like) to perform all or a part of the steps of the implementations of this application. The foregoing storage medium includes any medium that can store program codes, such as a USB flash disk, a removable hard disk, a read-only memory (ROM), a random access memory (RAM), a magnetic disk, or an optical disk.

The foregoing descriptions are merely specific implementations of this application but are not intended to limit the protection scope of this application. Any variation or replacement readily figured out within the technical scope disclosed in this application shall fall within the protection scope of this application. Therefore, the protection scope of this application shall be subject to the protection scope of the claims.

What is claimed is:

1. A terminal device, comprising:
a processor; and
a memory connected to the processor and storing instructions, wherein the processor, when executing the instructions, is configured to cause the terminal device to:
   generate a locating message of the terminal device using a first radio access technology (RAT), wherein the locating message of the terminal device comprises:
      a first locating parameter of a cell of a first node, the first node corresponding to the first RAT; and
      a second locating parameter of a cell of a second node, the second node corresponding to a second RAT; and
   send the locating message to a location management function entity in a core network of a fifth-generation (5G) communication system through signaling over an air interface using the second RAT,
   wherein the locating message is configured to enable the location management function entity to determine a location of the terminal device using the first locating parameter and the second locating parameter, wherein the first locating parameter comprises time difference of arrival or cell identifier information of the first node and the second locating parameter comprises time difference of arrival or cell identifier information of the second node.

2. The terminal device according to claim 1, wherein the first node is a secondary node providing a service to the terminal device in a multi-connectivity network.

3. The terminal device according to claim 1, wherein the second node is a primary node providing a service to the terminal device in a multi-connectivity network.

4. The terminal device according to claim 3, wherein to cause the terminal device to send the locating message, the processor is further configured to:
   cause the terminal device to send the locating message of the terminal device to the location management function entity through a radio resource control (RRC) layer of the primary node.

5. The terminal device according to claim 1, wherein the first RAT is Long-Term Evolution (LTE), and the second RAT is New Radio (NR).

6. The terminal device according to claim 1, wherein the locating message comprises a plurality of locating parameters of a plurality of cells of the first node.

7. The terminal device of claim 1, wherein at least one of the first locating parameter and the second locating parameter comprises uplink and downlink time differences of arrival.

8. A method for positioning a terminal device in a multi-connectivity network, the method comprising:
   generating a locating message of the terminal device using a first radio access technology (RAT), wherein the locating message of the terminal device comprises:
      a first locating parameter of a cell of a first node, the first node corresponding to the first RAT; and
      a second locating parameter of a cell of a second node, the second node corresponding to a second RAT; and
   sending, by the terminal device, the locating message to a location management function entity in a core network of a fifth-generation (5G) communication system through signaling over an air interface using the second RAT, wherein the locating message is configured to enable the location management function entity to determine a location of the terminal device using the first locating parameter and the second locating parameter, wherein the location of the terminal device comprises a physical location of the terminal device, wherein the first locating parameter comprises time difference of arrival or cell identifier information of the first node and the second locating parameter comprises time difference of arrival or cell identifier information of the second node.

9. The method according to claim 8, wherein the first node is a secondary node providing a service to the terminal device in a multi-connectivity network.

10. The method according to claim 8, wherein the second node is a primary node providing a service to the terminal device in a multi-connectivity network.

11. The method according to claim 10, wherein sending the locating message comprises:
sending the locating message of the terminal device to the location management function entity through a radio resource control (RRC) layer of the primary node.

12. The method according to claim 8, wherein the first RAT is Long-Term Evolution (LTE), and the second RAT is New Radio (NR).

13. The method according to claim 8, wherein the locating message comprises a plurality of locating parameters of a plurality of cells of the first node.

14. The method of claim 8, wherein the sending the locating message comprises transmitting the locating message as a non-access stratum payload message included in a radio resource control message.

15. An apparatus, comprising:
a location management function entity in a core network of a fifth-generation (5G) communication system, wherein the location management function entity comprises:
a processor; and
a memory connected to the processor and storing instructions, wherein the processor, when executing the instructions, is configured to:
receive a locating message of a terminal device sent from the terminal device through signaling over an air interface using a second radio access technology (RAT); and
locate the terminal device according to the locating message,
wherein the locating message comprises:
a first locating parameter of a cell of a first node, the first node corresponding to a first RAT; and
a second locating parameter of a cell of a second node, the second node corresponding to the second RAT,
wherein the first locating parameter comprises time difference of arrival or cell identifier information of the first node and the second locating parameter comprises time difference of arrival or cell identifier information of the second node.

16. The apparatus according to claim 15, wherein the first node is a secondary node providing a service to the terminal device in a multi-connectivity network.

17. The apparatus according to claim 15, wherein the second node is a primary node providing a service to the terminal device in a multi-connectivity network.

18. The apparatus according to claim 15, wherein the locating message comprises a plurality of locating parameter of a plurality of cells of the first node, and the processor is further configured to:
select a target cell from the plurality of cells; and
locate the terminal device according to the locating parameter of the target cell.

19. The apparatus according to claim 18, wherein each one of the locating parameters of the cell comprises a respective cell identifier (ID) or an indicator of a primary cell or a secondary cell, and the processor is further configured to select the target cell according to the cell IDs or the indicators.

20. The apparatus according to claim 15, wherein the processor, when executing the instructions, is further configured to perform triangulation using the first locating parameter, the second locating parameter, or both the first locating parameter and the second locating parameter.

* * * * *